US009509918B2

(12) United States Patent
Liu et al.

(10) Patent No.: US 9,509,918 B2
(45) Date of Patent: Nov. 29, 2016

(54) METHOD AND DEVICE FOR OBTAINING HIGH DYNAMIC RANGE IMAGE

(71) Applicant: BYD COMPANY LIMITED, Shenzhen (CN)

(72) Inventors: Huaren Liu, Shenzhen (CN); Shuijiang Mao, Shenzhen (CN); Jingjun Fu, Shenzhen (CN); Wei Feng, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 14/783,474

(22) PCT Filed: Apr. 21, 2014

(86) PCT No.: PCT/CN2014/075781
§ 371 (c)(1),
(2) Date: Oct. 9, 2015

(87) PCT Pub. No.: WO2014/176994
PCT Pub. Date: Nov. 6, 2014

(65) Prior Publication Data
US 2016/0057333 A1 Feb. 25, 2016

(30) Foreign Application Priority Data

Apr. 28, 2013 (CN) .......................... 2013 1 0154552

(51) Int. Cl.
H04N 5/235 (2006.01)
H04N 9/04 (2006.01)
H04N 5/355 (2011.01)
H04N 1/387 (2006.01)

(52) U.S. Cl.
CPC .......... *H04N 5/2355* (2013.01); *H04N 1/3871* (2013.01); *H04N 5/35581* (2013.01); *H04N 9/045* (2013.01); *H04N 2201/0084* (2013.01)

(58) Field of Classification Search
CPC ........... H04N 5/2355; H04N 5/35581; H04N 9/045–9/083; G06T 5/007–5/009
See application file for complete search history.

(56) References Cited

U.S. PATENT DOCUMENTS

2011/0050950 A1* 3/2011 Nomura ................. H04N 5/235
348/224.1
2012/0194686 A1 8/2012 Lin et al.
2012/0281111 A1 11/2012 Jo et al.

FOREIGN PATENT DOCUMENTS

| CN | 102420944 A | 4/2012 |
| CN | 102769756 A | 11/2012 |
| EP | 2 565 843 A2 | 3/2013 |
| WO | WO 2012/006251 A1 | 1/2012 |
| WO | WO 2012/006252 A1 | 1/2012 |
| WO | WO 2012/006253 A1 | 1/2012 |

OTHER PUBLICATIONS

International Search Report and Written Opinion from corresponding International Patent Application No. PCT/CN2014/075781 dated Jul. 30, 2014.

* cited by examiner

Primary Examiner — Paul Berardesca
(74) Attorney, Agent, or Firm — Alston & Bird LLP

(57) ABSTRACT

A method and a device for obtaining a high dynamic range image are provided. The method includes: obtaining a pixel value of each pixel in two images of a same scene; determining a brightness value of each pixel in the two images; determining an objective brightness value of each pixel in a combined image combining the two images; determining a color value of each pixel in the two images; determining a color value of each pixel in the combined image; correcting the color value of each pixel in the combined image so as to obtain a corrected color value of each pixel in the combined image; determining a pixel value of each pixel in the combined image; and obtaining a high dynamic range image.

23 Claims, 3 Drawing Sheets

METHOD AND DEVICE FOR OBTAINING HIGH DYNAMIC RANGE IMAGE

CROSS-REFERENCE TO RELATED APPLICATIONS

The present application is a U.S. National Stage of International Application No. PCT/CN2014/075781, filed Apr. 21, 2014, titled "METHOD AND DEVICE FOR OBTAINING HIGH DYNAMIC RANGE IMAGE," which claims the benefit of Chinese Patent Application No. 201310154552.3, filed Apr. 28, 2013, titled "METHOD AND DEVICE FOR OBTAINING HIGH DYNAMIC RANGE IMAGE," each of which is incorporated by reference herein in its entirety.

FIELD

The present disclosure relates to an image processing technology, and in particular, relates to a method and a device for obtaining a high dynamic range image.

BACKGROUND

Nowadays, a dynamic range of a nature scene is greatly beyond a capture capacity of an existing digital equipment. Conventional low dynamic range devices cannot completely cover the dynamic range of a real scene, especially of an extremely dark scene or an extremely bright scene.

Generally, in order to obtain a high dynamic range image by an imaging system with a standard dynamic range, different exposure parameters are used to obtain multiple low dynamic range images of a same static scene, and then the multiple images are combined, in which each low dynamic range image is responsible for collecting different details of the high dynamic scene, an underexposed image mainly records high brightness details of the scene, and an overexposed image is used to record the dark area of the scene.

One method for obtaining the high dynamic range image is as follows. Firstly, a long exposure image (having a large exposure) and a short exposure image (having a small exposure) of the same scene are obtained. Then, the pixel value of each pixel in the long exposure image is combined with the pixel value of each pixel in the short exposure image according to a certain proportion to obtain the pixel value of each pixel in the high dynamic range image. Specifically, the pixel value RESULT of each pixel in the combined image is determined according to RESULT=L*(1−A)+S*A, in which S is the pixel value of each pixel in the short exposure image, L is the pixel value of each pixel in the long exposure image, A is the proportion of the short exposure image and is defined according to A=K*Y_S_AVE/256, where Y_S_AVE is the average brightness value of the short exposure time image, and K is an adjustable value. After processing all the pixels in the images, the high dynamic range image is obtained.

The color of the image obtained by the above method is darker, which is because: a brightness value of the overexposed area of the long exposure image is large, but the long exposure image does not provide any color information; a brightness value of the short exposure image is small, but the short exposure image provides some color information; the brightness value of the combined image is much larger than the brightness value of the short exposure image, but the color information of the combined image is provided by the short exposure image. Therefore, the color value of the combined image is relatively small, which results in that the color of the combined image is dark.

SUMMARY

The purpose of the present disclosure is to solve at least one of the problems existing in the conventional technology to at least some extent.

According to embodiments of a first aspect of the present disclosure, a method for obtaining a high dynamic range image is provided. The method includes: obtaining a pixel value of each pixel in a long exposure image and a short exposure image of a same scene; determining a brightness value of each pixel in the long exposure image and the short exposure image according to the pixel value of each pixel in the long exposure image and the short exposure image; determining an objective brightness value of each pixel in a combined image combining the long exposure image with the short exposure image according to the brightness value of each pixel in the long exposure image and the short exposure image; determining a color value of each pixel in the long exposure image and the short exposure image according to the pixel value and the brightness value of each pixel in the long exposure image and the short exposure image; determining a color value of each pixel in the combined image according to the color value of each pixel in the long exposure image and the short exposure image; correcting the color value of each pixel in the combined image according to the brightness value of each pixel in the long exposure image and the short exposure image and the objective brightness value of each pixel in the combined image so as to obtain a corrected color value of each pixel in the combined image; determining a pixel value of each pixel in the combined image according to the objective brightness value and the corrected color value of each pixel in the combined image; and obtaining a high dynamic range image according to the pixel value of each pixel in the combined image.

With the method for obtaining a high dynamic range image according to embodiments of the present disclosure, by obtaining the pixel value of each pixel in the long exposure image and the short exposure image of the same scene, determining the color value and the brightness value of each pixel in the long exposure image, determining the objective color value of the combined image and correcting the color value of the combined image, and combining the images according to the objective color value and the corrected color value, a problem of the dark color of the combined image is solved, and the color value of the combined image is increased.

According to embodiments of a second aspect of the present disclosure, a device for obtaining a high dynamic range image is provided. The device includes: a first obtaining module, configured to obtain the pixel value of each pixel a long exposure image and a short exposure image of a same scene; a first determining module, configured to determine a brightness value of each pixel in the long exposure image and the short exposure image according to the pixel value of each pixel in the long exposure image and the short exposure image; a second determining module, configured to determine an objective brightness value of each pixel in a combined image combining the long exposure image with the short exposure image according to the brightness value of each pixel in the long exposure image and the short exposure image; a third determining module, configured to determine a color value of each pixel in the long exposure image and the short exposure image according to the pixel value and the brightness value of each pixel in the long exposure image and the short exposure image, and to determine a color value of each pixel in the combined image according to the color value of each pixel in the long exposure image and the short exposure image; a color correcting module, configured to correct the color value of each pixel in the combined image according to the brightness value of each pixel in the long exposure image and the short exposure image and the objective brightness value of each pixel in the combined image so as to obtain a corrected color value of each pixel in the combined image; a fourth determining module, configured to determine a pixel value of each pixel in the combined image according to the objective brightness value and the corrected color value of each pixel in the combined image; and a second obtaining module, configured to obtain a high dynamic range image according to the pixel value of each pixel in the combined image.

With the device for obtaining a high dynamic range image according to embodiments of the present disclosure, by obtaining the pixel value of each pixel in the long exposure image and the short exposure image of the same scene, determining the color value and the brightness value of each pixel in the long exposure image, determining the objective color value of the combined image and correcting the color value of the combined image, and combining the images according to the objective color value and the corrected color value, a problem of the dark color of the combined image is solved, and the color value of the combined image is increased.

Additional aspects and advantages of embodiments of present disclosure will be given in part in the following descriptions, become apparent in the part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
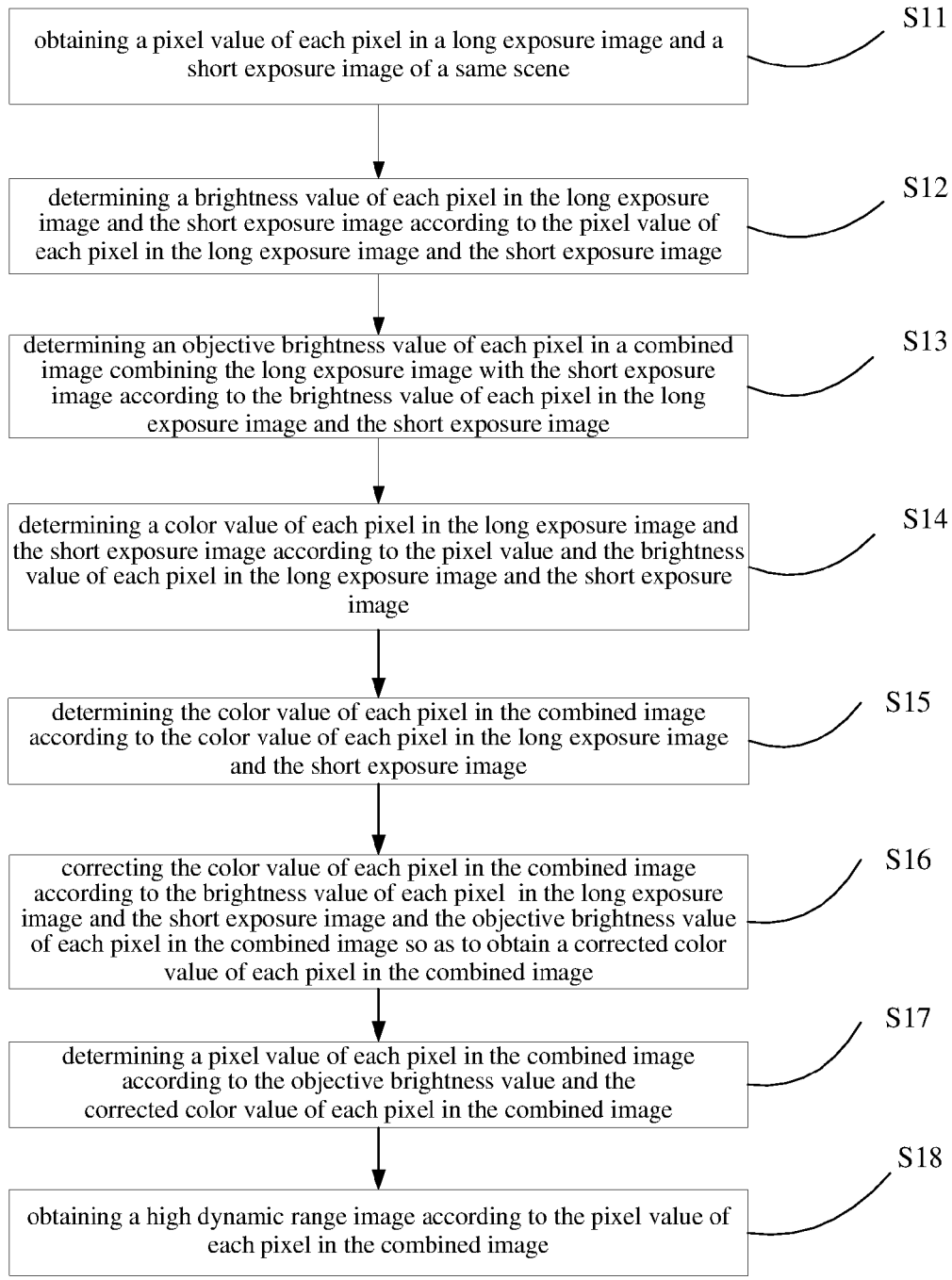
FIG. 1 is a flow chart showing a method for obtaining a high dynamic range image according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Various embodiments and examples are provided in the following description to implement different structures of the present disclosure. In order to simplify the present disclosure, certain elements and settings will be descried. However, these elements and settings are only by way of example and are not intended to limit the present disclosure. In addition, reference numerals may be repeated in different examples in the present disclosure. This repeating is for the purpose of simplification and clarity, and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may include an embodiment in which an additional feature is formed between the first feature and the second feature so that the first feature does not directly contact the second feature.

Terms concerning attachments, coupling and the like, such as "connected", refer to a relationship in which structures are secured or attached to one another either directly or indirectly through intervening structures, as well as both movable or rigid attachments or relationships, unless expressly described otherwise. Unless specified or limited otherwise, the terms "connected" and variations thereof are used broadly and encompass both direct and indirect mountings, connections, supports, and couplings. Further, "connected" are not restricted to physical or mechanical connections.

The embodiments of the present disclosure will be described in detail hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Figure 2:
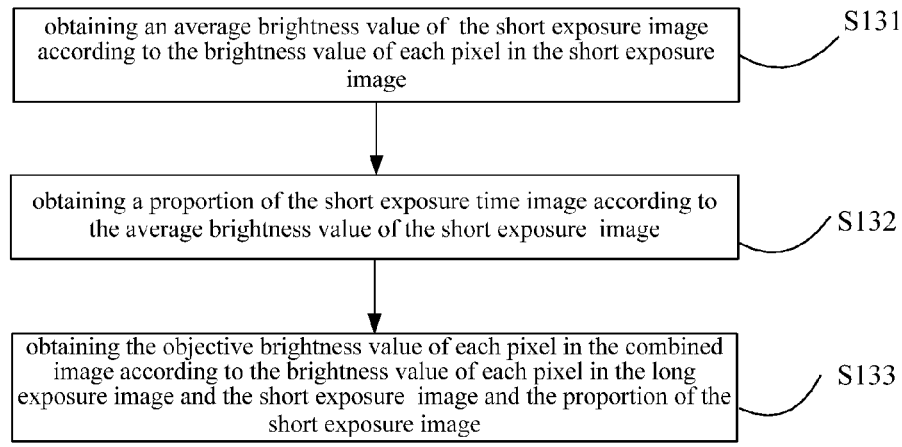
FIG. 2 is a flow chart showing a method for determining an objective brightness value of each pixel in a combined image according to an embodiment of the present disclosure.
Figure 3:
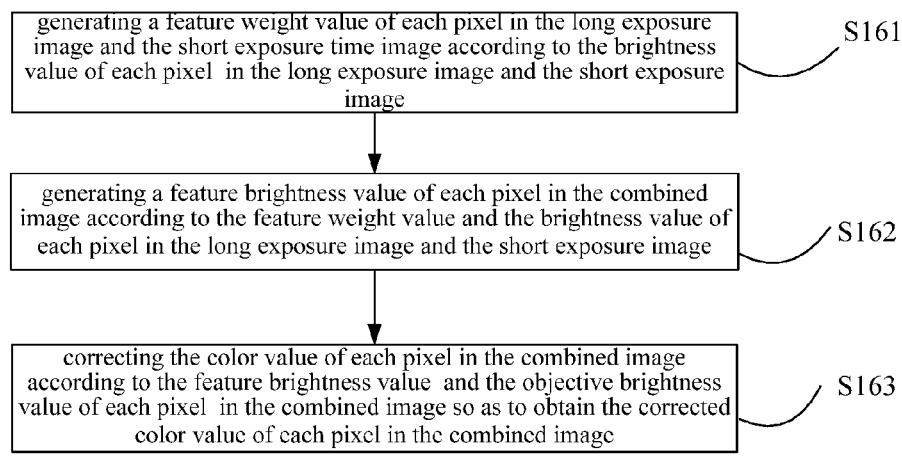
FIG. 3 is a flow chart showing a method for correcting a color value of each pixel in a combined image according to an embodiment of the present disclosure.

Referring to FIGS. 1-3, the method for obtaining a high dynamic range image according to a first aspect of the present disclosure will be described below.

In one embodiment of the present disclosure, as shown in FIG. 1, the method for obtaining a high dynamic range image includes the following steps: S11, obtaining a pixel value of each pixel in a long exposure image and a short exposure image of a same scene; S12, determining a brightness value of each pixel in the long exposure image and the short exposure image according to the pixel value of each pixel in the long exposure image and the short exposure image; S13, determining an objective brightness value of each pixel in a combined image combining the long exposure image with the short exposure image according to the brightness value of each pixel in the long exposure image and the short exposure image; S14, determining a color value of each pixel in the long exposure image and the short exposure image according to the pixel value and the brightness value of each pixel in the long exposure image and the short exposure image; S15, determining a color value of each pixel in the combined image according to the color value of each pixel in the long exposure image and the short exposure image; S16, correcting the color value of each pixel in the combined image according to the brightness value of each pixel in the long exposure image and the short exposure image and the objective brightness value of each pixel in the combined image so as to obtain a corrected color value of each pixel in the combined image; S17, determining a pixel value of each pixel in the combined image according to the objective brightness value and the corrected color value of each pixel in the combined image; S18, obtaining a high dynamic range image according to the pixel value of each pixel in the combined image.

At step 11, a long exposure time and a short exposure time of a camera equipment are firstly set up, and then the camera equipment is used to take the long exposure image and the short exposure image of the same scene. Subsequently, the pixel value of each pixel in the long exposure image and the short exposure image are obtained. The long exposure time and the short exposure time do not have specific values. Compared with a normal exposure image, an exposure of the long exposure image is relatively large, and the short exposure image is underexposed. The long exposure time is set in order to make a darker area of the scene exposed correctly to reflect enough details, the short exposure time is set in order to make a brighter area of the scene exposed correctly to reflect enough details. The long exposure image and the short exposure image should be strictly aligned in a pixel level to prevent ghost image on the finally combined high dynamic range image.

At step 12, the brightness value of each pixel in the long exposure image and the short exposure image are determined as follows. Assuming that the pixel value of one pixel in the long exposure image is $B\_L(i, j)$, and the pixel values of adjacent pixels are $B\_L(i-1, j)$, $B\_L(i+1, j)$, $B\_L(i, j-1)$, $B\_L(i, j+1)$, $B\_L(i-1, j-1)$, $B\_L(i-1, j+1)$, $B\_L(i+1, j-1)$ and $B\_L(i+1, j+1)$, in which i is a row value, and j is a column value, and then $Y\_L(i, j)$ is the brightness value of the pixel in the long exposure image, the brightness value of the pixel in the long exposure image $Y\_L(i, j)$ is determined according to $Y\_L(i, j)=1/16*(4*B\_L(i, j)+2*B\_L(i-1, j)+2*B\_L(i+1, j)+2*B\_L(i, j-1)+2*B\_L(i, j+1)+B\_L(i-1, j-1)+B\_L(i-1, j+1)+B\_L(i+1, j-1)+B\_L(i+1, j+1))$. The above steps are repeated until all the pixels in the long exposure image are processed. The brightness value of each pixel in the short exposure image can also be determined according to the above method.

FIG. 2 is a flow chart showing a method for determining an objective brightness value of each pixel in a combined image according to an embodiment of the present disclosure. The combined image here is not the final image, just one image during the process of obtaining the image, and the value of the combined image are obtained by combining the value of the long exposure image with the value of the short exposure image. As shown in FIG. 2, the objective brightness value of each pixel in the combined image is determined as follows.

At step S131, an average brightness value of the short exposure image is obtained according to the brightness value of each pixel in the short exposure image. Specifically, a sum of the brightness value of each pixel in the short exposure image is firstly obtained, and then the sum is divided by a number of pixels in the short exposure image.

At step S132, a proportion of the short exposure image is determined according to the average brightness value of the short exposure image. Specifically, the proportion of the short exposure image is determined according to $A=K*Y\_S\_AVE/256$, where A is the proportion of the short exposure image, K is a predetermined value, and $Y\_S\_AVE$ is the average brightness value of the short exposure image.

The larger the global brightness of the short exposure image is, the more scene information is recorded. Thus, the larger the proportion of the short exposure image is, the more information the combined image reflects.

Therefore, if the predetermined value K is too small, the proportion A is smaller, which can not sufficiently reflect the scene information recorded in the short exposure image. If the predetermined value K is too large, the proportion A is larger, which results in that the combined image is darker. Therefore, the predetermined value K is set in a range from 0.5 to 1.5, and the proportion A is limited in a range from 20% to 50%.

At step S133, the objective brightness value of each pixel in the combined image is determined according to the brightness value of each pixel in the long exposure image and the short exposure image, and the proportion of the short exposure image. Specifically, the objective brightness value of each pixel in the combined image is determined according to $Y\_T=Y\_L*(1-A)+Y\_S*A$, in which $Y\_T$ is the objective brightness value of a pixel in the combined image, $Y\_L$ is the brightness value of a pixel in the long exposure image, $Y\_S$ is the brightness value of a pixel in the short exposure image and at a same location with the pixel in the long exposure image, and A is the proportion of the short exposure image. For example, if the brightness value of one pixel in the long exposure image is $Y\_L(i, j)$, the brightness value of the pixel in the short exposure image and at the same location with the long exposure image is $Y\_S(i, j)$, then the objective brightness value $Y\_T(i, j)$ of the pixel in the combined image is determined according to $Y\_T(i, j)=Y\_L(i, j)*(1-A)+Y\_S(i, j)*A$. The above steps are repeated until all the pixels in the combined image are processed.

At step S14, the color value of each pixel in the long exposure image and the short exposure image is obtained by subtracting the brightness value of each pixel from the pixel value of each pixel. For example, if the brightness value of one pixel in the long exposure image is $Y\_L(i, j)$, the pixel value of the pixel in the long exposure image is $B\_L(i, j)$, then the color value $COLOR\_L(i, j)$ of the pixel is determined according to $COLOR\_L(i, j)=B\_L(i, j)-Y\_L(i, j)$. The above steps are repeated until all the pixels in the long exposure image are processed. The color value of each pixel in the short exposure image can also be determined according to the above method.

At step S15, the color value of each pixel in the combined image can be determined by adding the color value of each pixel in the long exposure image to the color value of each pixel in the short exposure image. For example, if the color value of one pixel in the long exposure image is $COLOR\_L(i, j)$, the color value of one pixel in the short exposure image and at the same location with the pixel in the long exposure image is $COLOR\_S(i, j)$, then the color value of the pixel in the combined image and at the same location with the pixels in the long exposure image and the short exposure image is obtained according to $COLOR(i, j)=COLOR\_L(i, j)+COLOR\_S(i, j)$. The above steps are repeated until all the pixels in the combined image are processed.

FIG. 3 is a flow chart showing a method for correcting a color value of each pixel in a combined image according to an embodiment of the present disclosure. Referring to FIG. 3, the color value of each pixel in the combined image may be corrected as follows.

At step S161, a feature weight value of each pixel in the long exposure image and the short exposure image is generated according to the brightness value of each pixel both in the long exposure image and the short exposure image.

The pixel value of an 8 bit image generally ranges from 0 to 255. After observing a large number of images, it is found that the brightness value of the detail concentrated area of the image is about 128 (i.e., a medium pixel value of the pixel values in the image). Therefore, the closer to 128 the brightness value of the pixel in the image is, the more detail information of the image can be reflected, and thus the larger the feature weight value of the pixel should be. Specifically, the feature weight value of each pixel in the long exposure image and the short exposure image is determined according to: Weight_L=M−abs(M−Y_L) and Weight_S=M—abs(M−Y_S), where Weight_L is the feature weight value of each pixel in the long exposure image, Weight_S is the feature value of each pixel in the short exposure image, M is the medium pixel value of the pixel values in the short exposure image or the long exposure image. In one embodiment, M is 128. At Step S162, a feature brightness value of each pixel in the combined image is generated according to the feature weight value and the brightness value of each pixel in the long exposure image and the short exposure image. Specifically, the feature brightness value Y_M of each pixel in the combined image is determined according to Y_M=(Y_L*Weight_L+Y_S*Weight_S)/(Weight_L+Weight_S).

At Step S163, the color value of each pixel in the combined image is corrected according to the feature brightness value and the objective brightness value of each pixel in the combined image so as to obtain the corrected color value of each pixel in the combined image. Specifically, the corrected color value XCOLOR of each pixel in the combined image is determined according to XCOLOR=(Y_T/Y_M)*COLOR.

In one embodiment, the pixel value RESULT of each pixel in the combined image is determined according to RESULT=Y_T+XCOLOR, in which Y_T is the objective brightness values of each pixel in the combined image, and XCOLOR is the corrected color value of each pixel in the combined image.

In one embodiment of the present disclosure, before obtaining the pixel value of each pixel in the long exposure image and the short exposure image, it can be determined whether there is a need to obtain a high dynamic range image, and if yes, step S11 is executed, and if no, the normal exposure image is captured, and an ordinary dynamic range image is obtained.

With the method for obtaining a high dynamic range image according to embodiments of the present disclosure, by obtaining the pixel value of each pixel in the long exposure image and the short exposure image of the same scene, determining the color value and the brightness value of each pixel in the long exposure image, determining the objective color value of the combined image and correcting the color value of the combined image, and combining the images according to the objective color value and the corrected color value, a problem of the dark color of the combined image is solved, and the color value of the combined image is increased.

Figure 4:
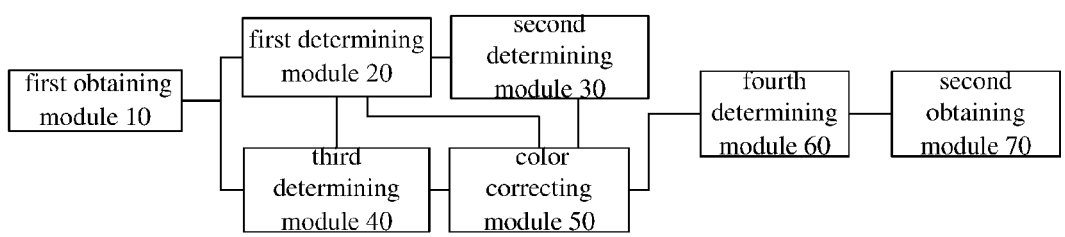
FIG. 4 is a schematic diagram showing a device for obtaining a high dynamic range image according to an embodiment of the present disclosure.

According to another aspect of the present disclosure, a device for obtaining a high dynamic range image is provided. As shown in FIG. 4, the device includes a first obtaining module 10, a first determining module 20, a second determining module 30, a third determining module 40, a color correcting module 50, a fourth determining module 60 and a second obtaining module 70.

The first obtaining module 10 is configured to obtain a pixel value of each pixel in a long exposure image and a short exposure image of a same scene. The first determining module 20 is configured to determine a brightness value of each pixel in the long exposure image and the short exposure image according to the pixel value of each pixel in the long exposure image and the short exposure image. The second determining module 30 is configured to determine an objective brightness value of each pixel in a combined image combining the long exposure image with the short exposure image according to the brightness value of each pixel in the long exposure image and the short exposure image. The third determining module 40 is configured to determine a color value of each pixel in the long exposure image and the short exposure image according to the pixel value and the brightness value of each pixel in the long exposure image and the short exposure image, and to determine a color value of each pixel in the combined image according to the color value of each pixel in the long exposure image and the short exposure image. The color correcting module 50 is configured to correct the color value of each pixel in the combined image according to the brightness value of each pixel in the long exposure image and the short exposure image and the objective brightness value of each pixel in the combined image so as to obtain a corrected color value of each pixel in the combined image. The fourth determining module 60 is configured to determine a pixel value of each pixel in the combined image according to the objective brightness value and the corrected color value of each pixel in the combined image. The second obtaining module 70 is configured to obtain a high dynamic range image according to the pixel value of each pixel in the combined image.

In some embodiments of the present disclosure, the first obtaining module 10 can obtain the long exposure image and the short exposure image of the same scene by adjusting the exposure time and the gain value.

Figure 5:
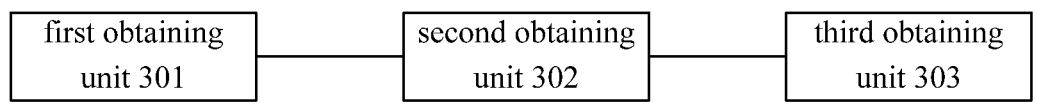
FIG. 5 is a schematic diagram showing a second determining module according to an embodiment of the present disclosure.

In some embodiments of the present disclosure, as shown in FIG. 5, the second determining module 30 may include a first obtaining unit 301, a second obtaining unit 302 and a third obtaining unit 303.

The first obtaining unit 301 is configured to obtain an average brightness value of the short exposure image according to the brightness value of the short exposure image. Specifically, the average brightness value of each pixel in the short exposure image is determined by obtaining a sum of the brightness value of each pixel in the short exposure image, and then dividing the sum by a number of pixels in the short exposure image.

The second obtaining unit 302 is configured to determine a proportion of the short exposure image according to the average brightness value of each pixel in the short exposure image. In particular, the proportion A of the short exposure image is determined according to A=K*Y_S_AVE/256, in which K is a predetermined value, and Y_S_AVE is the average brightness value of the short exposure image. If the predetermined value K is too small, the proportion A is smaller, which can not sufficiently reflect the scene information recorded in the short exposure image. If the predetermined value K is too large, the proportion A is larger, which results in that the combined image is darker. Therefore, the predetermined value K is set in the range from 0.5 to 1.5, and the proportion A is limited in the range from 20% to 50%.

The third obtaining unit 303 is configured to determine the objective brightness value of each pixel in the combined image according to the brightness value of each pixel in the long exposure image and the short exposure image and the proportion of the short exposure image. Specifically, the objective brightness value Y_T of each pixel is determined according to Y_T=Y_L*(1−A)+Y_S*A, in which Y_L is the brightness value of a pixel in the long exposure image, Y_S is the brightness value of a pixel in the short exposure image and at the same location with the pixel in the long exposure image, and A is the proportion of the short exposure image.

Figure 6:
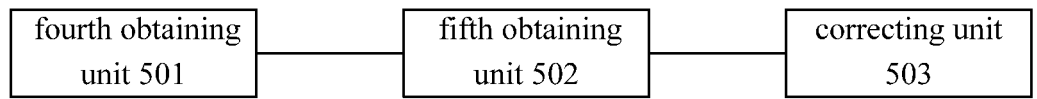
FIG. 6 is a schematic diagram showing a color correcting module according to an embodiment of the present disclosure.

In some embodiments of the present disclosure, as shown in FIG. 6, the color correcting module 50 may include a fourth obtaining unit 501, a fifth obtaining unit 502 and a correcting unit 503.

The fourth obtaining unit 501 is configured to generate a feature weight value of each pixel in the long exposure image and the short exposure image according to the brightness value of each pixel both in the long exposure image and the short exposure image. Specifically, the feature weight value of each pixel in the long exposure image and the short exposure image is determined according to Weight_L=M−abs(M−Y_L) and Weight_S=M−abs(M−Y_S), where Weight_L is the feature weight value of a pixel in the long exposure image, Weight_S is the feature weight value of a pixel in the short exposure image, and M is a medium pixel value of the pixel values in the long exposure image or the short exposure image.

The fifth obtaining unit 502 is configured to generate a feature brightness value of each pixel in the combined image according to the feature weight value and the brightness value of each pixel in the long exposure image and the short exposure image. Specifically, the feature brightness value Y_M of each pixel in the combined image is determined according to:

$$Y\_M=(Y\_L*\text{Weight}\_L+Y\_S*\text{Weight}\_S)/(\text{Weight}\_L+\text{Weight}\_S).$$

The correcting unit 503 is configured to correct the color value of each pixel in the combined image according to the feature brightness value and the objective brightness value of each pixel in the combined image. Specifically, the corrected color value XCOLOR of each pixel in the combined image is determined according to XCOLOR=(Y_T/Y_M)*COLOR, in which COLOR is the color value of each pixel in the combined image.

In some embodiments of the present disclosure, the fourth determining module 60 is configured to determine the pixel value RESULT of each pixel in the combined image according to RESULT=Y_T+XCOLOR, in which Y_T is the objective brightness values of each pixel in the combined image, and XCOLOR is the corrected color value of each pixel in the combined image.

In some embodiments of the present disclosure, the device for obtaining the high dynamic range image may further include a function selection switch configured to be turned on or off according to whether there is a need to process an image to obtain a high dynamic range image. When the bright area of the scene is overexposed or the dark area of the scene is underexposed, details are lost, and then the function selection switch can be turned on so as to process the image to obtain a high dynamic range image, thus expanding the dynamic range of the image and increasing visual details. Otherwise, the function selector switch can be turned off.

With the device for obtaining the high dynamic range image according to embodiments of the present disclosure, by obtaining the pixel value of each pixel in the long exposure image and the short exposure image of the same scene, determining the color value and the brightness value of each pixel in the long exposure image, determining the objective color value of the combined image and correcting the color value of the combined image, and combining the images according to the objective color value and the corrected color value, a problem of the dark color of the combined image is solved, and the color value of the combined image is increased.

It will be understood that, the flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that order of execution may differ from that which is depicted. For example, the order of execution of two or more boxes may be scrambled relative to the order shown. Also, two or more boxes shown in succession in the flow chart may be executed concurrently or with particular concurrence. In addition, any number of counters, state variables, warning semaphores, or messages might be added to the logical flow described herein, for purpose of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, communicate, propagate, or transport the program for the instruction execution system, apparatus, device, or the device for use by in connection with the instruction execution system, apparatus, device. The computer readable medium can include any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device. Further, the computer-readable medium could even be paper or another suitable medium upon which the program is printed, for example, by the paper or other medium for optical scanning, and then edit, interpretation or in other suitable way for processing when necessary to obtain the program, and then stored in a computer memory.

Although the device, system, and method of the present disclosure is embodied in software or code executed by general purpose hardware as discussed above, as an alternative the device, system, and method may also be embodied in dedicated hardware or a combination of software/ general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc.

Such technologies are generally well known by those skilled in the art and consequently, are not described in detail herein. It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but not limited to read-only memories magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for obtaining a high dynamic range image, comprising:
   obtaining a pixel value of each pixel in a long exposure image and a short exposure image of a same scene;
   determining a brightness value of each pixel in the long exposure image and the short exposure image according to the pixel value of each pixel in the long exposure image and the short exposure image;
   determining an objective brightness value of each pixel in a combined image combining the long exposure image with the short exposure image according to the brightness value of each pixel in the long exposure image and the short exposure image;
   determining a color value of each pixel in the long exposure image and the short exposure image according to the pixel value and the brightness value of each pixel in the long exposure image and the short exposure image;
   determining a color value of each pixel in the combined image according to the color value of each pixel in the long exposure image and the short exposure image;
   correcting the color value of each pixel in the combined image according to the brightness value of each pixel in the long exposure image and the short exposure image and the objective brightness value of each pixel in the combined image so as to obtain a corrected color value of each pixel in the combined image;
   determining a pixel value of each pixel in the combined image according to the objective brightness value and the corrected color value of each pixel in the combined image; and
   obtaining a high dynamic range image according to the pixel value of each pixel in the combined image.

2. The method of claim 1, wherein determining an objective brightness value of each pixel in a combined image according to the brightness value of each pixel in the long exposure image and the short exposure image comprises:
   obtaining an average brightness value of the short exposure image according to the brightness value of each pixel in the short exposure image;
   determining a proportion of the short exposure image according to the average brightness value of the short exposure image; and
   determining the objective brightness value of each pixel in the combined image according to the brightness value of each pixel in the long exposure image and the short exposure image and the proportion of the short exposure image.

3. The method of claim 2, wherein obtaining an average brightness value of the short exposure image comprises:
   obtaining a sum of the brightness value of each pixel in the short exposure image; and
   dividing the sum by a number of pixels in the short exposure image.

4. The method of claim 2, wherein the proportion of the short exposure image is determined according to:

$$A = K * Y\_S\_AVE/256;$$

wherein A is the proportion of the short exposure image, K is a predetermined value, and Y_S_AVE is the average brightness value of the short exposure image.

5. The method of claim 2, wherein the objective brightness value of each pixel in the combined image is determined according to:

$$Y\_T = Y\_L * (1-A) + Y\_S * A;$$

wherein Y_T is the objective brightness value of a pixel in the combined image, Y_L is the brightness value of a pixel in the long exposure image, A is the proportion of the short exposure image, and Y_S is the brightness value of a pixel in the short exposure image and at a same location with the pixel in the long exposure image.

6. The method of claim 1, wherein the color value of each pixel in the combined image is determined according to:

$$COLOR = COLOR\_L + COLOR\_S;$$

wherein COLOR is the color value of a pixel in the combined image, COLOR_L is the color value of a pixel in the long exposure image, and COLOR_S is the color value of a pixel in the short exposure image and at a same location with the pixel in the long exposure image.

7. The method of claim 1, wherein correcting the color value of each pixel in the combined image according to the brightness value of each pixel in the long exposure image and the short exposure image and the objective brightness value of each pixel in the combined image comprises:
generating a feature weight value of each pixel in the long exposure image and the short exposure image according to the brightness value of each pixel in the long exposure image and the short exposure image;
generating a feature brightness value of each pixel in the combined image according to the feature weight value and the brightness value of each pixel in the long exposure image and the short exposure image; and
correcting the color value of each pixel in the combined image according to the feature brightness value and the objective brightness value of each pixel in the combined image, so as to obtain the corrected color value of each pixel in the combined image.

8. The method of claim 7, wherein the feature weight value of each pixel in the long exposure image and the short exposure image is determined according to:

$$Weight\_L = M - abs(M - Y\_L),$$

$$Weight\_S = M - abs(M - Y\_S),$$

wherein Weight_L is the feature weight value of a pixel in the long exposure image,
Weight_S is the feature weight value of a pixel in the short exposure image,
Y_L is the brightness value of the pixel in the long exposure image,
Y_S is the brightness value of the pixel in the short exposure image and at a same location with the pixel in the long exposure image, and
M is a medium pixel value of the pixel values in the long exposure image or the short exposure image.

9. The method of claim 8, wherein the feature brightness value Y_M of each pixel in the combined image is determined according to:

$$Y\_M = (Y\_L * Weight\_L + Y\_S * Weight\_S)/(Weight\_L + Weight\_S).$$

10. The method of claim 9, wherein the corrected color value of each pixel in the combined image is determined according to:

$$XCOLOR = (Y\_T/Y\_M) * COLOR;$$

wherein XCOLOR is the corrected color value, and Y_T is the objective brightness value of each pixel in the combined image.

11. The method of claim 10, wherein a pixel value result of each pixel in the combined image is determined according to:

$$RESULT = Y\_T + XCOLOR;$$

wherein RESULT is the pixel value result.

12. A device for obtaining a high dynamic range image, comprising:
at least one processor; and
at least one memory including computer program code, the at least one memory and the computer program code configured to, with the at least one processor, cause the apparatus to at least:
obtain a pixel value of each pixel in a long exposure image and a short exposure image of a same scene;
determine a brightness value of each pixel in the long exposure image and the short exposure image according to the pixel value of each pixel in the long exposure image and the short exposure image;
determine an objective brightness value of each pixel in a combined image combining the long exposure image with the short exposure image according to the brightness value of each pixel in the long exposure image and the short exposure image;
determine a color value of each pixel in the long exposure image and the short exposure image according to the pixel value and the brightness value of each pixel in the long exposure image and the short exposure image, and to determine the color value of each pixel in the combined image according to the color value of each pixel in the long exposure image and the short exposure image;
correct the color value of each pixel in the combined image according to the brightness value of each pixel in the long exposure image and the short exposure image and the objective brightness value of each pixel in the combined image, so as to obtain a corrected color value of each pixel in the combined image;
determine the pixel value of each pixel in the combined image according to the objective brightness value and the corrected color value of each pixel in the combined image; and
obtain a high dynamic range image according to the pixel value of each pixel in the combined image.

13. The device of claim 12, wherein, to determine an objective brightness value of each pixel, the device is further caused, at least in part to:
obtain an average brightness value of the short exposure image according to the brightness value of each pixel in the short exposure image;
determine a proportion of the short exposure image according to the average brightness value of each pixel in the short exposure image; and
determine the objective brightness value of each pixel in the combined image according to the brightness value of each pixel in the long exposure image and the short exposure image and the proportion of the short exposure image.

14. The device of claim 13, wherein the average brightness value of the short exposure image is determined by:
obtaining a sum of the brightness value of each pixel in the short exposure image, and then dividing the sum by a number of pixels in the short exposure image.

15. The device of claim 13, wherein the proportion A of the short exposure image is determined according to:

$$A = K * Y\_S\_AVE/256;$$

wherein K is a predetermined value, and
Y_S_AVE is the average brightness value of the short exposure image.

16. The device of claim 13, wherein the objective brightness values Y_T of each pixel in the combined image is determined according to:

$$Y\_T = Y\_L * (1-A) + Y\_S * A;$$

wherein Y_L is the brightness value of a pixel in the long exposure image, A is the proportion of the short exposure image, and
Y_S is the brightness value of a pixel in the short exposure image and at a same location with the pixel in the long exposure image.

17. The device of claim 12, wherein the color value COLOR of each pixel in the combined image is determined according to:

$$COLOR=COLOR\_L+COLOR\_S;$$

wherein COLOR_L is the color value of a pixel in the long exposure image, and

COLOR_S is the color value of a pixel in the short exposure image and at a same location with the pixel in the long exposure image.

18. The device of claim 12, wherein, to correct the color value of each pixel, the device is further caused, at least in part to:

generate a feature weight value of each pixel in the long exposure image and the short exposure image according to the brightness value of each pixel in the long exposure image and the short exposure image ;

generate a feature brightness value of each pixel in the combined image according to the feature weight value and the brightness value of each pixel in the long exposure image and the short exposure image; and correct the color value of each pixel in the combined image according to the feature brightness value and the objective brightness value of each pixel in the combined image to obtain the corrected color value of each pixel in the combined image.

19. The device of claim 18, wherein the feature weight value of each pixel in the long exposure image and the short exposure image is determined according to:

$$Weight\_L=M-abs(M-Y\_L),$$

$$Weight\_S=M-abs(M-Y\_S);$$

wherein Weight_L is the feature weight value of a pixel in the long exposure image, Weight_S is the feature value of a pixel in the short exposure image, Y_L is the brightness value of the pixel in the long exposure image, Y_S is the brightness value of the pixel in the short exposure image and at a same location with the pixel in the long exposure image, and M is a medium pixel value of the pixel values in the long exposure image or the short exposure image.

20. The device of claim 19, wherein the feature brightness value Y_M of each pixel in the combined image is determined according to:

$$Y\_M=(Y\_L*Weight\_L+Y\_S*Weight\_S)/(Weight\_L+Weight\_S).$$

21. The device of claim 20, wherein the corrected color value of each pixel in the combined image is determined according to:

$$XCOLOR=(Y\_T/Y\_M)*COLOR,$$

wherein XCOLOR is the corrected color value, and Y_T is the objective brightness value of each pixel in the combined image.

22. The device of claim 21, wherein a pixel value result of the combined image is determined according to:

$$RESULT=Y\_T+XCOLOR;$$

wherein RESULT is the pixel value result.

23. A computer program product comprising at least one non-transitory computer-storage medium having computer-executable instructions for performing the method of claim 1.

* * * * *